United States Patent [19]
Planeta et al.

[11] Patent Number: 6,013,212
[45] Date of Patent: Jan. 11, 2000

[54] GAUGE DISTRIBUTION IN TUBULAR PLASTIC FILM WITH EDGE CONTROL

[75] Inventors: Mirek Planeta; Peter V. Tkach, both of Mississauga, Canada

[73] Assignee: Macro Engineering & Technology Inc., Mississauga, Canada

[21] Appl. No.: 09/092,039

[22] Filed: Jun. 5, 1998

Related U.S. Application Data

[60] Provisional application No. 60/048,827, Jun. 6, 1997.

[51] Int. Cl.[7] ............................. B29C 49/04; B65H 43/00
[52] U.S. Cl. .................................... 264/40.7; 264/177.17; 425/135; 425/150; 226/19; 226/21; 226/23; 242/615.21; 242/534.1
[58] Field of Search ................................. 264/40.1, 40.7, 264/177.17; 425/135, 150; 226/19, 20, 21, 22, 23; 242/615.21, 534.1

[56] References Cited

U.S. PATENT DOCUMENTS

| | | |
|---|---|---|
| 3,492,693 | 2/1970 | Clarke et al. . |
| 3,570,735 | 3/1971 | Kurz ............................................. 226/3 |
| 3,716,322 | 2/1973 | Kratzert .................................... 425/392 |
| 3,768,949 | 10/1973 | Upmeier ................................... 425/392 |
| 4,676,728 | 6/1987 | Planeta ................................... 425/387.1 |
| 4,760,627 | 8/1988 | Schele ......................................... 26/87 |
| 4,860,964 | 8/1989 | Ishii et al. ............................... 242/57.1 |
| 5,589,201 | 12/1996 | Tkach et al. ............................... 425/66 |

*Primary Examiner*—Jan H. Silbaugh
*Assistant Examiner*—Michael Poe
*Attorney, Agent, or Firm*—Rogers F. Delbridge

[57] ABSTRACT

A method of controlling lateral wandering of flattened tubular plastic film in gauge distribution apparatus in which gauge distribution is effected by passing a flattened tubular plastic film around at least one turning bar whose position with respect to the film is varied. The method comprises adjusting the position of a turning bar in response to a signal from the sensor which senses the position of one of the side edges of the flattened film before it is wound on a storage roll. When lateral wandering of the flattened tubular film is sensed, the position of the turning bar is varied until the sensor detects that the film has returned to its desired path.

1 Claim, 2 Drawing Sheets

GAUGE DISTRIBUTION IN TUBULAR PLASTIC FILM WITH EDGE CONTROL

This application claims priority from U.S. Provisional Patent Application No. 60/048,827 filed Jun. 6, 1997.

FIELD OF THE INVENTION

This invention relates to gauge distribution in tubular plastic film.

BACKGROUND OF INVENTION

It is well known that, when tubular plastic film is extruded in a molten state from an annular die and then passed as an air filled bubble before being flattened by passing through a collapsing frame and between a pair of nip rollers, irregularities occur in the thickness, i.e. gauge, of the film. Since the flattened film is then usually wound on a storage roll, it is usually necessary to provide apparatus for moving the two layers of the flattened film relatively to one another so that irregularities in film thickness, i.e. in its gauge, are distributed across the width of the storage roll to avoid the problems which would arise if this was not done. This process is commonly known as gauge distribution, and various types of apparatus are used for this purpose. One type of gauge distribution apparatus is described in U.S. Pat. No. 4,676,728 (Planeta) issued Jun. 30, 1987, and another type is described in U.S. Pat. No. 5,589,201 (Tkach et al) issued Dec. 31, 1996, the contents of these patents being incorporated herein by reference.

In the patents mentioned above, gauge distribution is effected by passing a tubular flattened film around at least one turning bar whose position with respect to the film is varied. In the preferred embodiment described in the earlier patent, the turning bars are vertical or inclined to the vertical whereas, in the described embodiments in the later patent, the turning bars are horizontal. It has been found in practice that for various reasons such as imperfect alignment, film sliding and non-uniform circular cross-section of the bubble, the flattened film passing from the gauge distribution apparatus to the storage roll tends to wander laterally from its desired path. Attempts have been made to overcome this problem by placing edge guides which guide the flattened film in the desired path to the storage roll, but such edge guides tend to induce tension in the flattened film which creates non-uniformity on the edges of a roll of flattened film on a storage roll.

SUMMARY OF THE INVENTION

It has now been found that such lateral wandering can be controlled by adjusting the position of a turning bar in response to a signal from a sensor which senses the position of one of the side edges of the flattened film before it is wound on a storage roll, the arrangement being such that, when lateral wandering of the flattened tubular film is sensed, the position of the turning bar is varied until the sensor detects that the film has returned to its desired path. Depending upon the nature of the gauge distribution apparatus, the variation of the position of the turning bar may be an angular variation or a linear variation.

DESCRIPTION OF THE DRAWINGS

Embodiments of the invention will now be described, by way of example, with reference to the accompanying drawings, of which.

DESCRIPTION OF PREFERRED EMBODIMENTS

Figure 1:
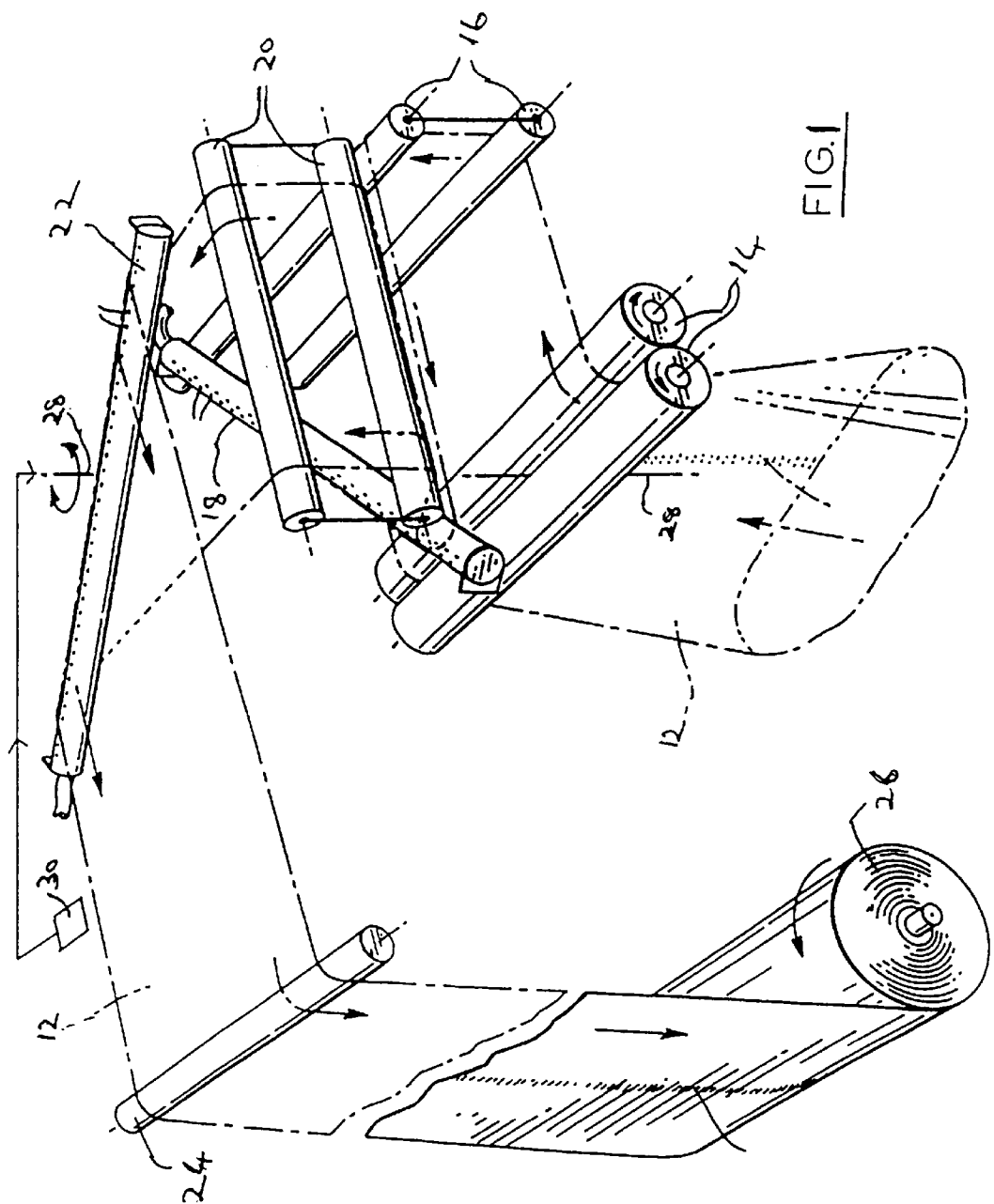
FIG. 1 is a diagrammatic view of an embodiment of the invention used with gauge distribution apparatus of the kind described in U.S. Pat. No. 5,589,201.

Referring to the drawings, FIG. 1 shows a tubular plastic film 12 proceeding as an air filled bubble to nip rollers 14. The flattened film then passes to a first pair of direction reversing rollers 16, then to a first horizontal turning bar 18, a second pair of direction reversing rollers 20 and a second horizontal turning bar 22. After leaving the second turning bar 22, the flattened film passes over an exit roller 24 to a wind-up roll 26.

The apparatus illustrated diagrammatically in FIG. 1 is more fully described in U.S. Pat. No. 5,589,201. In use, the nip rollers 14 and first direction reversing rollers 16 are rotated about a vertical axis 28 through 180° in each direction from a neutral position, the first turning bar 18 is rotated about a vertical axis through 135° in each direction from a neutral position, the second direction reversing rollers 20 are rotated about the vertical axis through 90° in each direction from the neutral position, and the second turning bar 22 is rotated about the vertical axis through 45° in each direction from the neutral position.

In accordance with the present invention, a photo-electric sensor 30 senses the lateral position of an edge of the flattened tubular film 12 between the second turning bar 22 and the exit roller 24. If the edge of the flattened film 12 wanders laterally, this is detected by the sensor 30 which sends a signal to a motor (not shown) which moves the turning bar 22 about the vertical axis 28 to cause the angular orientation of the second turning bar 22 to be slightly advanced or slightly retarded with respect to the angular position of the first turning bar 18 by an amount proportional to the amount of lateral edge wandering, such that the flattened tubular film 12 returns to the desired path whereupon the sensor 30 ceases sending an adjustment signal to the motor determining the angular position of the turning bar 22.

The sensor 30 may be placed at other suitable positions and, if desired, may be arranged to adjust the angular position of the first turning bar 18 instead of the second turning bar 22.

Figure 2:
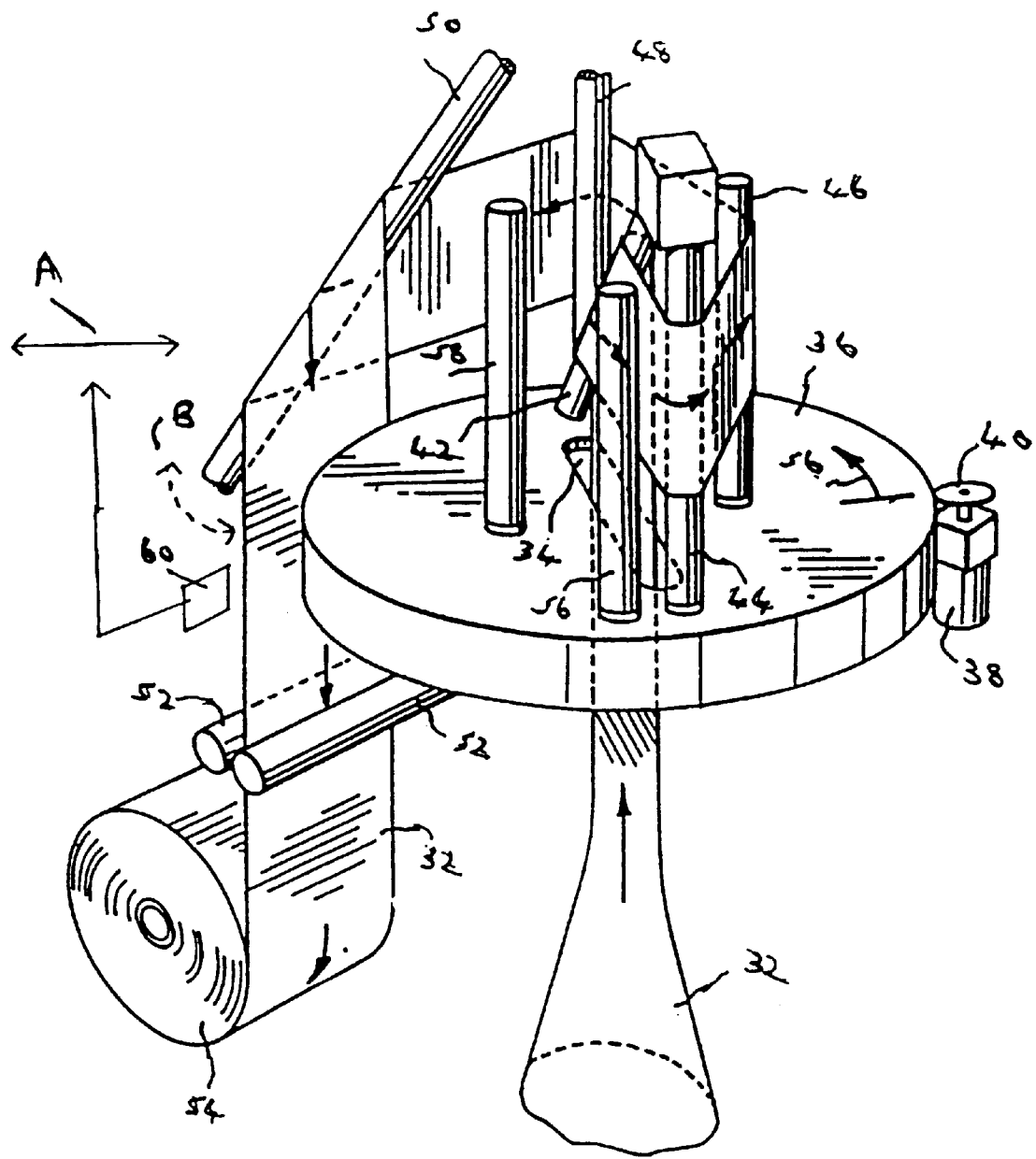
FIG. 2 is a similar view of an embodiment of the invention used with gauge distribution apparatus of the kind described in U.S. Pat. No. 4,676,728.

FIG. 2 shows a tubular plastic film 32 proceeding as an air filled bubble to nip rollers (not shown) and then upwardly through a slot 34 in a rotor 36 which is rotatable about a vertical axis by a motor 38 and driving sprocket 40. After passing through the slot 34, the flattened tubular film 32 passes around a turning bar 42 which changes movement of the flattened tubular film 32 from vertical to horizontal. The flattened tubular film 32 then passes around a vertical turning bar 44 carried by the rotor 36, a second turning bar 46 carried by the rotor 36, a third turning bar 48 mounted on the frame (not shown) of the apparatus, and a fifth turning bar 50 also mounted on the frame. The turning bar 50 is inclined at 45° to the vertical and directs the flattened tubular film 32 downwardly through a pair of nip rollers 52 to a wind-up roll 54.

The apparatus show in FIG. 2 is more fully described in U.S. Pat. No. 4,676,728. In use, the motor 36 rotates in one direction or the other such that the flattened tubular film 32 passes around the turning bars mentioned above or around further vertical turning bars 56, 58 mounted on the rotor 36.

In accordance with the present invention, a photo-electric sensor 60 senses the lateral position of an edge of the flattened tubular film 32 between the turning bar 50 and the nip rollers 52. If the edge of the flattened tubular film 32 wanders laterally from a desired path, this is detected by the sensor 60 which sends an adjustment signal to a motor (not shown) which moves the turning bar 50 linearly in a horizontal direction indicated by arrow A until the flattened tubular film 32 returns to its desired path, whereupon the sensor 60 ceases sending an adjustment signal. If desired, instead of linear horizontal movement, the turning bar 50 may be moved angularly in response to a signal from the sensor 60, for example in the manner indicated by the arrow B.

Other embodiments of the invention will be readily apparent to a person skilled in the art from the foregoing description of preferred embodiments, the scope of the invention being defined in the appended claims.

We claim:

1. In a method of controlling lateral edge wandering of flattened tubular plastic film in gauge distribution apparatus in which an upwardly vertically moving expanded tubular plastic film is collapsed to a two-layer flattened condition by collasping means which is rotated about a vertical axis in each direction from a neutral position, gauge distribution is subsequently effected by passing the flattened tubular plastic film around at least two turning bars which are rotated about a vertical axis in each direction from a neutral position, and the position of at least one of which with respect to the film is varied, the improvement comprising:

adjusting the position of a first turning bar about the vertical axis to cause the angular orientation of a second turning bar to be slightly advanced or slightly retarded with respect to the position of the first turning bar in response to a signal from a sensor which senses the position of one of the side edges of the flattened film before it is wound on a storage roll such that, when lateral edge wandering of the flattened film is sensed, the position of the first turning bar is varied relative to the second turning bar by an amount proportional to the amount of lateral edge wandering until the sensor detects that the film has returned to its desired path.

* * * * *